(12) United States Patent
Ishida

(10) Patent No.: US 6,323,270 B1
(45) Date of Patent: Nov. 27, 2001

(54) POLYBENZOXAZINE NANOCOMPOSITES OF CLAY AND METHOD FOR MAKING SAME

(75) Inventor: Hatsuo Ishida, Shaker Heights, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 09/442,200

(22) Filed: Nov. 16, 1999

Related U.S. Application Data

(60) Provisional application No. 60/108,598, filed on Nov. 16, 1998.

(51) Int. Cl.⁷ ................................................. C08K 3/34
(52) U.S. Cl. ........................ 524/445; 501/148; 524/446; 524/447
(58) Field of Search ..................... 428/333, 338, 428/339; 501/148; 523/210; 524/445, 446, 447

(56) References Cited

U.S. PATENT DOCUMENTS

| | | | |
|---|---|---|---|
| 4,105,578 | * 8/1978 | Finlayson | 252/316 |
| 4,450,095 | * 5/1984 | Finlayson | 252/315.2 |
| 5,514,734 | 5/1996 | Maxfield et al. | 523/204 |
| 5,830,528 | 11/1998 | Beall et al. | 427/220 |
| 6,057,396 | * 5/2000 | Lan et al. | 524/445 |

OTHER PUBLICATIONS

Agag, T; Takeichi, T; J of Polymer Science "Polybenzoxazine–Montmorillonites Hybrid Nanocomposites: Synthesis and Characterization" vol. 41 (2000) pp 7038–7090.*

* cited by examiner

*Primary Examiner*—Edward J. Cain
*Assistant Examiner*—Katarzyna W. Lee
(74) *Attorney, Agent, or Firm*—Renner, Otto, Boisselle & Sklar

(57) ABSTRACT

A nanocomposite composition is disclosed which comprises clay and an effective amount of a benzoxazine monomer, oligomer, and/or polymer. In one embodiment, the presence of the benzoxazine monomer, oligomer, and/or polymer in the clay results in an at least about 5% increase in the spacing between the platelets of the clay. In another embodiment, the presence of the presence of the benzoxazine monomer, oligomer, and/or polymer in the clay results in at least about 5 wt. % of the clay being exfoliated. Also disclosed are a method for making (1) an intercalated nanocomposite clay composition which comprises clay and an effective amount of a benzoxazine monomer, oligomer, and/or polymer; (2) an exfoliated nanocomposite clay composition which comprises clay and an effective amount of a benzoxazine monomer, oligomer, and/or polymer; and (3) a method for making a nanocomposite clay composition that is both exfoliated and intercalated.

29 Claims, 6 Drawing Sheets

POLYBENZOXAZINE NANOCOMPOSITES OF CLAY AND METHOD FOR MAKING SAME

RELATED APPLICATION DATA

This application claims priority to previously filed U.S. Provisional Application No. 60/108,598, filed on Nov. 16, 1998, entitled "Blends of Benzoxazine and Clay", which is hereby incorporated by reference in its entirety.

FIELD OF THE INVENTION

The invention herein described relates generally to nanocomposites and/or blends of benzoxazines (monomer, oligomer and/or polymer) and clays. The invention described relates to nanocomposites and/or blends of benzoxazines and clay in which spacing between the platelet structure of the clay is increased by the benzoxazine compounds, thus indicating that the benzoxazine is either encompassing the clay particles or being inserted in between the platelets of the clay.

BACKGROUND OF THE INVENTION

Nanocomposites have recently attracted considerable attention as a means of enhancing polymer properties. In general there are two types of nanocomposite structures, intercalated and exfoliated. Such structures are classified according to the separation of the clay layers. In an intercalated nanocomposite, extended polymer chains are inserted between the host clay layers resulting in a well ordered multilayer nanostructure where the insertion of a polymer into the clay structure occurs in a crystallographically regular fashion regardless of the clay to polymer ratio. Intercalation of various monomers into the silicate galleries, followed by in-situ polymerization, yields highly oriented multi-layers consisting of the polymer alternately stacked with the layers of the host.

The host layers of exfoliated nanocomposites are dispersed in a continuous polymer matrix. The individual one nanometer thick clay layers of an exfoliated nanocomposite are separated by average distances that depend on loading. Exfoliated polymer-clay nanocomposites form when adjacent clay nanolayers are separated by a distance that precludes the possibility of interlayer interaction through the association of gallery cations.

For many technologically important polymers, the monomer intercalation/exfoliation approach is limited because a suitable monomer is not always available. However, various monomers have been used, yielding linear and crosslinked polymer matrices. This technique has been investigated with a number of vinyl monomers including tetrafluoroethylene, cis- and trans- butene, butadiene, 4-vinyl pyrridine, acrylamide, methyl methacrylate, acrylonitrile, and styrene. However, because the adsorption of monomer molecules between clay layers or lamellae is dependent on the dipole moment of the monomer, low yields are generated when any one of the above polymers are physically inserted into clay. The most successful polymerizations within silicate galleries tend to proceed by ring-opening mechanisms, for example the well known epoxy and Nylon-6 nanocomposites.

The use of high performance, high temperature polymers as the organic phase in nanocomposites presents special problems. One of the challenges in the area of high performance polymers is to obtain significant improvements in these classes of polymers, since many already have superb thermal and mechanical properties.

Polyimides are an example of a class of high performance polymers that have been used as matrices for nanocomposites. Since polyimides are used largely for microelectronics it is desirable to reduce the coefficient of thermal expansion, the amount of moisture absorption and the dielectric constant. The preparation of polyimide nanocomposites has shown a significant increase in the gas barrier properties and a decrease in the thermal conductivity. However, the water absorption ratio has not been improved remarkably, and mechanical properties of such nanocomposites have not yet been examined. Additionally, the thermal properties of a polyetherimide, specifically its fire retardant nature, has been examined in both intercalated and exfoliated nanocomposites. Both structures exhibited a delayed decomposition temperature compared to the unfilled polymer, and the immiscible hybrid containing the same amount of silicate showed no improvement, suggesting that formation of the nano-structure is responsible for the increase in the thermal stability.

Preparation of nanocomposites with "traditional" phenolic resins tends to produce an undesirable amount of water during polymerization, have poor processability, require the use of a strong catalyst(s), and have poor mechanical design flexibility.

Thus, there is a need for a compound which can be used to produce intercalated, exfoliated and intercalated/exfoliated nano-structures which possess superior processability, do not require the use of a strong catalyst(s), and have superior mechanical design flexibility. Additionally, there is a need for a monomer that can produce both intercalates and exfoliates in an organo-clay system and which upon polymerization does not produce an undesirable amount of water.

SUMMARY OF THE INVENTION

The invention herein described relates generally to nanocomposites and/or blends of benzoxazines (monomer, oligomer and/or polymer) and clays. More specifically, the invention described herein relates to clay which is dispersed in polybenzoxazines yielding either an intercalated, exfoliated or combination nanocomposite structure.

In accordance with one aspect of the invention, a nanocomposite composition comprises clay and an effective amount of a benzoxazine monomer, oligomer, and/or polymer.

In accordance with another aspect of the invention, the presence of the benzoxazine monomer, oligomer, and/or polymer in the clay results in an at least about 5% increase in the spacing between the platelets of the clay. Alternatively, the presence of the benzoxazine monomer, oligomer, and/or polymer in the clay results in at least about 5 wt. % of the clay being exfoliated.

In another aspect of the invention, the benzoxazine monomer, oligomer, and/or polymer is either bis(3,4-dihydro-2H-3-phenyl-1,3-benzoxazinyl) isopropane or is formed therefrom.

In another aspect of the invention, a nanocomposite composition comprises clay and an effective amount of a benzoxazine monomer, oligomer, and/or polymer wherein the benzoxazine monomer, oligomer, and/or polymer is either bis(3,4-dihydro-2H-3-phenyl-1,3-benzoxazinyl) isopropane or is formed therefrom and wherein the presence of the benzoxazine monomer, oligomer, and/or polymer in the clay results in an at least about 5% increase in the spacing between the platelets of the clay.

In another aspect of the invention, a method for preparing a nanocomposite clay composition comprises the steps of:

(A) providing a mixture comprising (1) benzoxazine oligomer or polymer and clay or (2) at least one phenolic compound, at least one primary amine, at least one aldehyde and clay; and (B) curing the mixture to produce a nanocomposite composition.

In another aspect of the invention, step (B) comprises the steps of: (B-1) curing the reaction mixture at a temperature of about 140° C.; (B-2) curing the reaction mixture at a temperature of about 160° C.; and (B-3) curing the reaction mixture at a temperature of about 190° C.

In another aspect of the invention, a method of forming a nanocomposite of clay with at least one benzoxazine compound comprises blending the clay with a benzoxazine monomer, oligomer, and/or polymer or benzoxazine precursors or combinations thereof with the benzoxazine component being in a liquid form such that the benzoxazine component can enter between the platelets of the clay under blending conditions.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
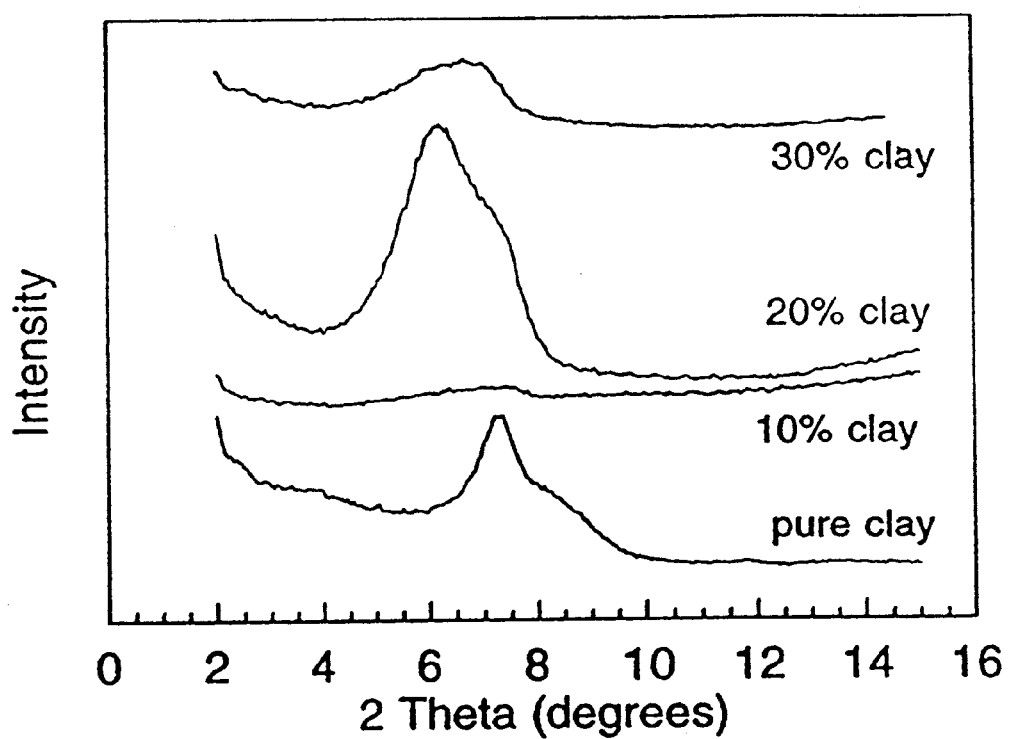
FIG. 1 is a composite of X-ray diffraction patterns of intercalated nanocomposites.

As used throughout the specification and claims, benzoxazines is used herein to refer to any chemical compound that has the characteristic benzoxazine ring (e.g., a heterocyclic ring containing nitrogen and oxygen).

Additionally, as used throughout the specification and claims, intercalate is defined as the situation where a material is inserted between the platelets or layers of another material. When a material is intercalated between the platelets of clay it means the material is inserted between the layers such that the distance between the platelets of the clay is increased a measurable amount.

Furthermore, exfoliate refers to casting off in scales, laminae, or splinters or to spread or extend by or as if by opening out leaves. With respect to clay it refers to separation of platelets, which proceeds to such an extent that the orientation and separation of the platelets becomes random. Thereafter the exfoliated platelets act as individual entities rather than a group of entities functioning together due to orientation. Exfoliation need not be complete and is often expressed as the percentage of material, which has become randomly distributed with respect to other platelets of the same material.

It has been discovered that poly-benzoxazines, a class of phenolic resin, can be used to intercalate, exfoliate or both intercalate and exfoliate clay. As is discussed below in detail, a polybenzoxazine polymer is prepared by ring-opening reactions of benzoxazine precursors. These resins alone have very attractive properties, overcoming the shortcomings associated with the above-mentioned polymers. For example, the polybenzoxazine resins of the present invention offer a superb balance of mechanical and physical properties for structural and other applications. The rich molecular design flexibility allows desired properties to be tailored, and thus the range of properties obtained by benzoxazine chemistry is very wide. In general, the ordinary performance polybenzoxazines used in the present invention compare favorably with advanced epoxies and phenolic resins whereas high performance polybenzoxazines used herein compete well with polyimides, with a fraction of the raw material cost. Benzoxazine polymers have been known to exhibit unusual properties seen in few polymers such as near-zero shrinkage, fast development of mechanical properties as a function of conversion, a Tg (glass transition temperature) much higher than cure temperature, and low water uptake despite having many hydrophilic groups.

As noted above, benzoxazine polymers are formed from the ring opening polymerization of benzoxazine monomers. Benzoxazine monomers are characterized or identified by the presence of one or more benzoxazine rings. The polymers are particularly useful in applications requiring resistance to burning or high thermal stability. Benzoxazine polymers are also useful as precursors to thermally stable chars formed by heating the benzoxazine to temperatures such as about 600° C., about 700° C., or about 800° C. in an inert environment (e.g. nitrogen) or in air. Of particular interest are the present polybenzoxazine resins which possess excellent mechanical and physical properties, including high Tg and char yield.

While clay blended with most polymers only results in a dispersion of clay aggregates in the polymer, with no significant change in the spacing of the platelets within the aggregates, it has been observed that when clay is dispersed in the polybenzoxazines disclosed herein, part of the polybenzoxazine is intercalated between the platelets resulting in an increase in the spacing distance between the platelets. Alternatively the benzoxazine can exfoliate the clay or result in a combination of exfoliated and intercalated clay.

In one embodiment, one or more of benzoxazine monomers or the monomers from which the benzoxazine oligomer(s) or polymer(s) is formed has the general formula

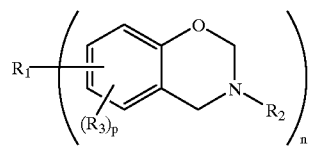

wherein $R_1$ individually is one or more groups selected from H; alkyl groups of 1 to 10 carbon atoms; aromatic groups, alkyl substituted aromatic groups, or aromatic substituted alkyl of 6 to 20 carbon atoms; mono or poly fluorine substituted compounds having at least one aromatic ring and 6 to 20 carbon atoms; or a benzoxazine from a phenolic compound of 6 to 20 carbon atoms; n is from 1 to 4; $R_2$ is an alkyl group of 1 to 10 carbon atoms; an aromatic group, a alkyl substituted aromatic groups or a aromatic substituted alkyl group of 6 to 20 carbon atoms; an amine of 1 to 10 carbon atoms; or a benzoxazine of 9 to 20 carbon atoms; $R_3$ is H or $R_2$; and p is an integer from 0 to 3. In one embodiment, at least about 5 mole % of the benzoxazine monomer, or a oligomer or polymer derived therefrom, is represented by the above-mentioned formula. In another embodiment, at least about 10 mole % of the benzoxazine monomer, or a oligomer or polymer derived therefrom, is represented by the above-mentioned formula. In still another embodiment, at least about 25 mole % of the benzoxazine monomer, or a oligomer or polymer derived therefrom, is represented by the above-mentioned formula.

Benzoxazines are prepared by reacting a phenolic compound with an aldehyde and an amine, desirably an aromatic amine. The conventional phenolic reactants for benzoxazines include, for instance, mono and polyphenolic compounds having one or more phenolic groups of the formula

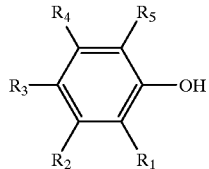

in which $R_1$ through $R_5$ can independently be H; OH; halogen; linear or branched aliphatic groups having from 1 to 10 carbon atoms; mono, di, or polyvalent aromatic groups having from 6 to 12 carbon atoms; or a combination of said aliphatic groups and said aromatic groups having from 7 to 12 carbon atoms; mono and divalent phosphine groups having up to 6 carbon atoms; or mono, di and polyvalent amines having up to 6 carbon atoms. In one embodiment, at least one of the ortho positions to the OH is unsubstituted, i.e. at least one of $R_1$ to $R_5$ is hydrogen. In polyphenolic compounds, one or more of the $R_1$ through $R_5$ can be an oxygen, an alkylene such as methylene or other hydrocarbon connecting molecule, etc. Further nonhydrogen and nonhalogen $R_1$ through $R_5$ groups as described above less one or more hydrogens or a P=O can serve to connect two or more phenolic groups creating a polyphenolic compound which can be the phenolic compound. Example of mono-functional phenols include phenol; cresol; 2-bromo-4-methylphenol; 2-allyphenol; 1,4-aminophenol; and the like. Examples of difunctional phenols (polyphenolic compounds) include phenolphthalane; biphenol; 4-4'-methylene-di-phenol; 4-4'-dihydroxybenzophenone; bisphenol-A; 1,8-dihydroxyanthraquinone; 1,6-dihydroxnaphthalene; 2,2'-dihydroxyazobenzene; resorcinol; fluorene bisphenol; and the like. Examples of trifunctional phenols comprise 1,3,5-trihydroxy benzene and the like. Polyvinyl phenol is also a suitable component for the benzoxazine compounds that constitute the subject of the invention.

In one embodiment, the phenolic compound used to form the benzoxazine monomer, oligomer and/or polymer is neither a novolac nor a resole resin (e.g., the phenolic novolac and resole resins are excluded). Phenolic novolac resins have the structure

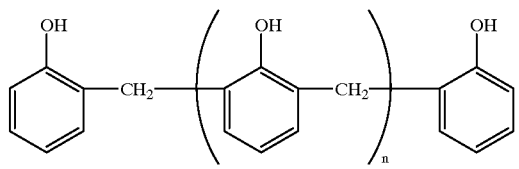

where n is from 0, 1, 2 etc., up to 5, 10 or 100. When novolac resins are reacted with formaldehyde, and an amine (e.g., aniline)

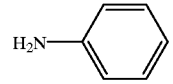

only the terminal phenols can form benzoxazine rings since the ortho-substituted phenolic repeating units in the middle of the novolac resin have no available ortho positions (with respect to the hydroxyl group) to form benzoxazine rings. The remaining phenol groups act as catalysts.

While novolac and resole resins are preferably excluded as phenolic compounds to form benzoxazine monomers other similar resins, e.g. bisphenol F or

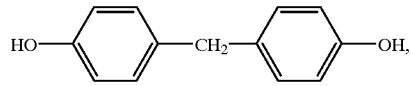

are preferably included. Bisphenol F differs from novolac resins where n=0 in that the bisphenol F is entirely para-substituted. Thus, a novolac resin where n=0 does not include bisphenol F. Preferred phenolic compounds include,

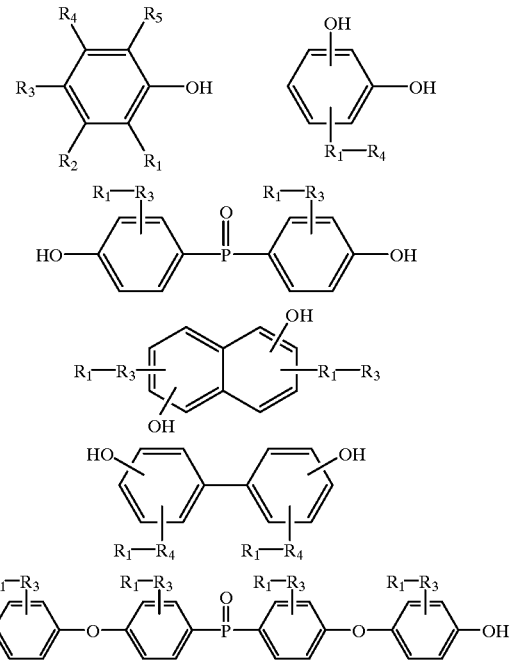

where $R_1$-$R_5$ are as described above, or combinations thereof.

The aldehyde reactants include vaporous formaldehyde; paraformaldehyde; polyoxymethylene; as well as aldehydes having the general formula RCHO, where R is aliphatic, including mixtures of such aldehydes, desirably having from 1 to 12 carbon atoms.

Amine reactants for forming the benzoxazines include mono, di, and polyfunctional amines desirably having from 2 to 40 carbon atoms and optionally including heteroatoms of O, N, S, and halogen. The amine can be aliphatic, aromatic, alkyl substituted aromatic or aromatic substituted alkyl. For the purposes of this paragraph, the primary amine is the functional group. The amine needs to have at least one primary amine to form a benzoxazine ring but may include secondary amine group(s) or any other functional group. If the amine is a di or polyamine, it may (under the right conditions) be reacted with two or more different phenols and aldehydes forming a benzoxazine monomer with two or more benzoxazine rings. Examples of difunctional amines are

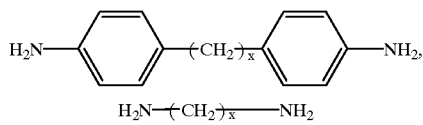

where x is a value from 1 to 20.
Preferred amines include

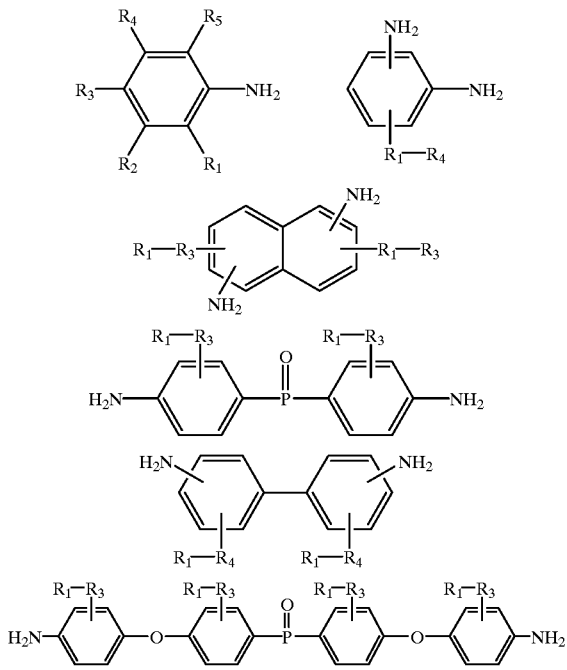

where $R_1$-$R_5$ are as described above for phenolics, or combinations thereof. The amine may be an oligomeric or polymeric amine such as an amine terminated polyester, polyether, polydiene, diene copolymer, polyamide, polysiloxane, etc.

U.S. Pat. No. 5,543,516, which is hereby incorporated by reference in its entirety, sets forth a generally solventless method of forming benzoxazines. Optionally, solvents can be used to prepare benzoxazines as is well known to the art. The reaction time can vary widely with reactant concentration, reactivity and temperature. Times desirably vary from a few minutes for solventless to a few hours, e.g. 6 or 10 for diluted reactants, If a water based solution of formaldehyde is used as one reactant then a water miscible organic solvent is sometimes desirable. if one or more reactant is a liquid it may be used to dissolve the other components. If all of the components are solids they may be premixed as solids and then melted or first melted and then mixed. The temperature of reaction is the temperature at which the formation of benzoxazine occurs. Examples of useful temperatures are from about −100° C. to about 250° C. In another embodiment, reaction temperatures are from about 0° C. or about 50° C. to about 150° C. Furthermore, the polymerization of a benzoxazine monomer can be conducted at a temperature in the range of from about −100° C. to about 200° C. In another embodiment, reaction temperatures are from about −60° C. to about 150° C.

The benzoxazine synthesis reaction may be conducted at atmospheric pressure or at a pressure up to about 100 psi. In one embodiment the reaction is carried out under pressure since fewer byproducts are produced. When a polyfunctional benzoxazine is being prepared, higher pressures generally results in relatively higher amounts of difunctional benzoxazine monomers.

The relative amounts of reactants required will depend upon their chemical nature, e.g., the number of reactive groups taking part in the reaction. The stoichiometry is well within the skills of those conversant with the art, and the required relative amounts of reactants are readily selected depending upon the functionality of the reacting compounds. The ultimate reaction mixture contains the desired benzoxazine monomer and oligomers thereof, as well as impurities. If desired, the mixture may be purified to obtain a more concentrated form of the product described, for example by well-known crystallization or solvent washing techniques. The resulting product can be partially or fully shaped by melt processing in conventional polymer and/or composite processing equipment. It can be polymerized by heating the monomer, for instance, to from about 120° C. to about 260° C. if no further initiator or catalyst is added.

The polymerization of benzoxazine monomers to a polymer is believed to be an ionic ring opening polymerization which converts the oxazine ring to another structure, e.g. linear polymer or larger heterocyclic rings. It is thought that a chain transfer step(s) limits the molecular weight of the resulting polymer and causes some branching. FTIR (Fourier transform infrared) analysis is often used to monitor the conversion of the oxazine rings to polymers to provide an estimate of the rate of polymerization at different temperatures. NMR (nuclear magnetic resonance) spectroscopy can also be used to monitor conversion of benzoxazine monomers to polymer. These include metal halides such as $AlCl_3$, $AlBr_3$, $AlBr_3 \cdot TiCl_4$, $BF_3$, $I_2$, $SnCl_4$, $SbCl_4$, $ZnCl_2$, $TiCl_4$, $TiCl_5$, $WCl_6$, $VCl_4$, $PCl_3$, $PCl_5$, $PF_5$, $SbCl_5$, $(C_6H_5)_3C^+(SbCl_6)^-$, t-BuCl/$Et_2AlCl$, $AlEtCl_2$, $BF_3Et_2O$ and $Cl_2$/$BCl_3$; organometallic derivatives such as $RAlCl_2$, $R_2AlCl$ and $R_2Al$ where R is a hydrocarbon and preferably an alkyl of 1 to 8 carbon atoms; metallophorphyrin compounds such as aluminum phthalocyanine chloride; methyl tosylate, methyl triflate, and triflic acid; and oxyhalides such as $POCl_3$, $CrO_2Cl$, $SOCl_2$, and $VOCl_3$. Other initiators include $HClO_4$ and $H_2SO_4$. The Lewis acid initiators are often used with a proton or cation donor such as water, alcohol, and organic acids.

U.S. Pat No. 6,225,440 filed on Jun. 26, 1998, entitled "Cationic Ring-Opening Polymerization of Benzoxazine", discloses methods by which to polymerize benzoxazine using a cationic ring-opening polymerization method initiated by the class of cationic initiators know as Lewis acids in addition to the other known cationic initiators. This application is hereby incorporated in its entirety by reference thereto.

The polymer from the polymerization of the benzoxazine monomers can be partially or fully converted to a high carbon char by heating in an atmosphere of air, nitrogen or other gas to a temperature from about 400° C. to about 700° C., about 800° C. or about 1000° C. The yield of char on heating to about 800° C. in nitrogen is desirably at least about 30 wt. % and can exceed about 65, 70 or 72 wt. %.

Nanocomposites are also derived from clays. Clay is a silicate comprised of multiple platelets. In another embodiment the clay is a hydrated aluminum silicate comprised of multiple platelets. It is a component of soils typically derived from the weathering of rocks. In one embodiment the clay aggregate has particle sizes of less than about 200 microns, in another less than about 100 microns and in still another embodiment less than about 50 microns. It can be various colors including red browns to pale buff. It is insoluble in water and most organic solvents. Typical types include montmorillonite, atapulgite, illite, bentonite, and halloysite. The clay may be chemically modified or otherwise modified including functionalized clay.

In one embodiment, clay is treated to exchange any metallic cations such as $Na^+$ or $K^+$ with organic cation to increase the organophillicity of the silicate layer. This lowers the surface energy and improves wetting with the polymer matrix. By selecting different surface modifying agents e.g. silanes or surfactants (e.g. amines) one can optimize the surface of the sheet silicate for the best interaction with the matrix resin. The ion exchanged clay can be more easily dispersed in an organic matrix to form an intercalated or exfoliated composite. Organic cations may be amines or polyamines with from 1 or 2 to 20 or 100 carbon atoms.

Another component that may be present be present is silanes (e.g. silane treating or coupling agents). Silane coupling agents are chemical compounds that have at least one silicon atom and at least two functional groups. The above-mentioned functionalized clay may include functional groups in which at least one functional group can react with a first chemical compound (e.g. clay) and at least one functional group that can react with a different second chemical compound (e.g. matrix polymer) coupling them together. Silane treating agents would generally have at least one functional group reactive with a single chemical compound. Thus silane treating agents just modify a surface of a single chemical compound, e.g. a clay filler, making the surface more compatible with another chemical compound (e.g. matrix polymer). Silane coupling and treating agents are well known to the art and are often used to compatibilize or couple polymers with various fillers, fibers, etc.

U.S. patent application Ser. No. 09/311,132 filed on May 13, 1999, pending entitled "General Approach to Nanocomposite Preparation", discloses additional methods by which to treat clay thereby rendering it functionalized, chemically modified, modified, or a combination thereof. This application is hereby incorporated in its entirety by reference thereto.

The clay and benzoxazine (monomer, oligomer, and/or polymer) can each be present in any concentration which results in intercalation of the benzoxazine into the spacing between the platelets of the clay. In one embodiment, the clay is up to about 75 or 80 weight percent of the composition. In another embodiment the clay is from about 1, 2 or 5 weight percent to about 60 or 70 weight percent of the composition. Additionally, it should be noted that here and else where in the specification range and ratio limits may be combined. The amount of benzoxazine may be less than or complementary to the amount of the clay. In one embodiment, at least about 1, 2, 5, or 10 parts by weight of clay is used per each about 100 parts by weight of benzoxazine monomer, oligomer, and/or polymer.

In one embodiment, the intercalation results in an increase of at least about 5% in the average spacing between the platelets. In another embodiment, the intercalation results in an increase of at least about 10, 20 or 30% in the average spacing between the platelets. In still another embodiment, exfoliation results in at least about 5 wt.% of the clay being dispersed as individual platelets. In still another embodiment, exfoliation results in at least about 10, 20, 40 or 50 wt. % of the clay being dispersed as individual platelets.

The blends of clay and benzoxazine (monomer, oligomer, and/or polymer) can be formed by various techniques which will be further described in detail below. The benzoxazine or precursors can be partially or fully dissolved in a solvent and then mixed with the clay with any conventional mixing equipment for liquids and polymers. The benzoxazine can be mixed with the clay before or after polymerization. The precursors of the benzoxazine (phenolic compound, aldehyde, and amine) can be mixed with the clay and the intercalated or exfoliated material is then formed during formation of the benzoxazine monomer. The benzoxazine may be mixed (including melt mixing) with the clay in polymer mixing equipment such as a Brabender, extruder, etc.

In general a benzoxazine can be prepared from bisphenol A, formaldehyde and aniline. This mixture can be mixed with clay in various combinations. In the Table 1 below the weight loss of the benzoxazine, clay and blends of clay and benzoxazine were evaluated for the temperature where about 5% and about 10% weight loss occurred. The weight loss from exposure to increasing temperatures was measured and recorded in the following table.

TABLE 1

| Sample | Temp. at 5% wt. Loss in ° C. | Temp. at 10% wt. Loss in ° C. |
|---|---|---|
| bis(3,4-dihydro-2H-3-phenyl-1,3-benzoxazinyl)isopropane (BA-a) | 330 | 348 |
| scpx 1558[1] (organically modified clay) | 289 | 559 |
| 10% clay (exfoliated) | 332 | 354 |
| 15% clay (exfoliated) | 328 | 360 |
| 20% clay (exfoliated) | 326 | 361 |
| 9.1% clay (intercalated) | 289 | 324 |
| 17% clay (intercalated) | 284 | 318 |
| 23% clay (intercalated) | 294 | 333 |
| 28% clay (intercalated) | 294 | 340 |
| 50% clay (intercalated) | 291 | 364 |

[1]Ion exchange clay material scpx 1558 from Southern Clay Products.

In the samples of Table 1 the percentage is the percentage of clay and the balance of each sample was benzoxazine. The exfoliated samples were prepared by melt blending the benzoxazine monomer and the clay. The intercalated samples were prepared by dissolving the benzoxazine monomer in a solvent and blending in the clay at room temperature. The solvent method was also tried at the reflux temperature of the solvent and this resulted in exfoliation of the clay. The exfoliated samples have lower char yield but higher onset temperature for degradation in comparison to intercalated samples. In temperature, the exfoliated samples are similar to BA-a, while intercalated samples resemble clay. The existence of intercalation and exfoliation was determined by x-ray analysis as will be discussed in detail below.

There are many methods to produce specific polymeric materials containing nanosize inorganic particles, nanocomposites. These methods to produce nanocomposites can be grouped into three general categories: (1) in situ polymerization; (2) solution intercalation; and (3) melt exfoliation. The common inorganic particle for all three methods is a clay mineral selected from the group consisting of smectite, vermiculite, halloysite and any synthetic analog thereof. Of the smectite clays, the most commonly used are montmorillonite, saponite, beidellite, nontrite, hectorite, and mixtures thereof with those skilled in the pertinent art exhibiting the greatest preference for montmorillonite.

An example of in situ polymerization of a nanocomposite is disclosed in U.S. Pat. No. 4,810,734, which is hereby incorporated by reference in its entirety, sets forth a process for producing a composite material. U.S. Pat. No. 4,810,734 discloses a method for the in situ polymerization of a nanocomposite polyamide and a nanocomposite vinyl polymer. The process of U.S. Pat. No. 4,810,734 for producing a composite material comprises a contacting step of contacting a layered clay mineral having a cation exchange capacity of 50 to 200 milliequivalents per 100 g with a swelling agent in the presence of a dispersion medium, thereby forming a complex which has the property of being swollen by a molten monomer and dispersion medium, a mixing step of mixing said complex containing said dispersion medium with a monomer, and a polymerization step of polymerizing said monomer contained in said mixture.

An example of solution intercalation of a nanocomposite is disclosed in U.S. Pat. No. 5,102,948, which is hereby incorporated by reference in its entirety. U.S. Pat. No. 5,102,948, discloses a method for producing the composite material which is characterized by obtaining a composite in which a layered silicate, with a cation exchange capacity of 50 to 200 milliequivalents/100 g, is in the swelling condition in a dispersion medium, and mixing the composite with a polyamide resin for a residence time of 30 minutes or less, to obtain a composite material in which the layered silicate is uniformly dispersed in the polyamide resin.

Similar to in situ polymerization, a predetermined amount of a clay mineral is dispersed into a dispersion medium and then a swelling agent is added to this mixture. However, unlike in situ polymerization, this mixture is mixed with a polymer resin instead of a monomer of a polymer. The mixing then forms the nanocomposite polymer. A multitude of swelling agents are disclosed in U.S. Pat. No. 5,376,604, which is hereby incorporated by reference in its entirety. The present invention is not to be limited to the swelling agents which are based on a hydroxypolyoxyethylenealky ammonium ion.

Melt exfoliation or melt intercalation is described in Polymer Layered Silicate Nanocomposites, Giannelis, *Adv. Mater.* 1996, 8, No. 1, 29. Unlike in situ polymerization or solution intercalation, melt exfoliation only involves the clay mineral and the polymer without the need for a swelling agent or a dispersion medium. However, a swelling agent may be used to enhance the exfoliation of the clay mineral by particular polymers. In melt exfoliation, the clay mineral and the polymer are mixed together then heated to a temperature above the softening point of the polymer. Melt exfoliation depends on the dipole interactions between the negative charges on the functional groups of the polymer interacting with a cation on the surface of the clay. An example of a clay used in melt exfoliation is montmorillonite which has a single layer of aluminum octahedron in between two layers of silicon tetrahedra. When montmorillonite is in its sodium exchanged form, the dipole moment in the sodium is induced by the isomorphic substitution of magnesium (+2) for aluminum (+3) in the octahedral layer of the clay structure. By attempting to neutralize the charge deficiency, the positively charged sodium may interact with negatively charged functional groups on the polymer such as esters, carbonyls, amides, alcohols, and amines. In melt exfoliation, the clay is substantially exfoliated by the polymer thereby forming the nanocomposite polymer. Exfoliation is the complete separation of the individual platelets into the polymer matrix such that no coherent x-ray diffraction occurs.

Production of Intercalated and Exfoliated Clay Structures

Ion exchanged clay material, scpx 1558, was obtained from Southern Clay Products. Benzoxazine precursors, paraformaldehyde and aniline (99.5%), were purchased from Aldrich. Bisphenol-A was obtained from Shell Chemical Company. All materials were used as received.

The solventless synthesis and purification of bis(3,4-dihydro-2H-3-phenyl-1,3-benzoxazinyl)isopropane, herein referred to as BA-a, was carried out as follows. The structure of the BA-a monomer is shown below:

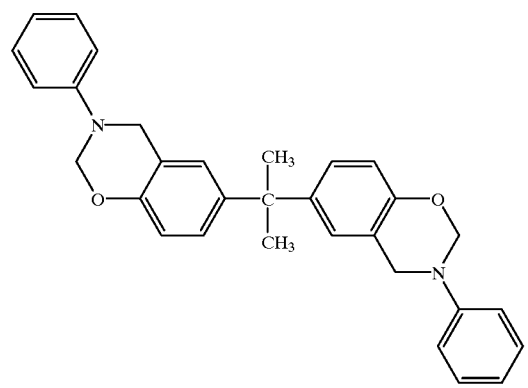

Intercalated structures were prepared by rapid stirring, with a magnetic stirrer, of the benzoxazine monomer dissolved in chloroform (50 ml) and clay dispersed in deionized water (50 ml). The clay concentration was varied between about 10 and about 30 wt. %. The mixture was stirred for three days followed by removal of the water and chloroform by a rotary evaporator, then dried in a vacuum oven at about 60° C. to about 90° C. (e.g., about 80° C.) for 12 hours. By using the rotary evaporator to remove the solvent, none of the bulk benzoxazine was washed away after mixing. The sample was then step cured by heating at about 120° C. to about 149° C. (e.g., about 140° C.) for one half hour, at about 150° C. to about 174° C. (e.g., about 160° C.) for one half hour, and at about 175° C. to about 200° C. (e.g., about 190° C.) for 2 hours.

Exfoliated structures were obtained by one of two methods. The first was heating during the solution preparation. This was accomplished by either refluxing the solution for three days, or by evaporating the solvent after 12 hours, adding new solvent and water, and stirring for the remaining two and a half days. The solvent and water were again removed by the rotary evaporator, and the samples were dried in the vacuum oven at about 60° C. to about 90° C. (e.g., about 80° C.) for 12 hours. This method was used to obtain solution-exfoliated nanocomposites with about 10% and about 40 wt. % clay. The second method of preparing exfoliated nanocomposites was melt mixing. The monomer was heated to about 70° C. to about 99° C. (e.g., about 90° C.) and mixed with clay for one half hour. Using this method, the clay concentration was varied from about 2% to about 40wt. %. The exfoliated samples were also cured using the above-mentioned step curing schedule.

X-ray powder diffraction, XRD, patterns were obtained using a Philips XRG 3100 X-ray diffractometer with a Ni filtered Cu-Kα radiation source. The data were recorded in the reflection mode in the range of 2θ=2 to 15°, using a scanning speed and step size of about 0.3°/min and about 0.050°, respectively.

X-ray Analysis

Figure 2:
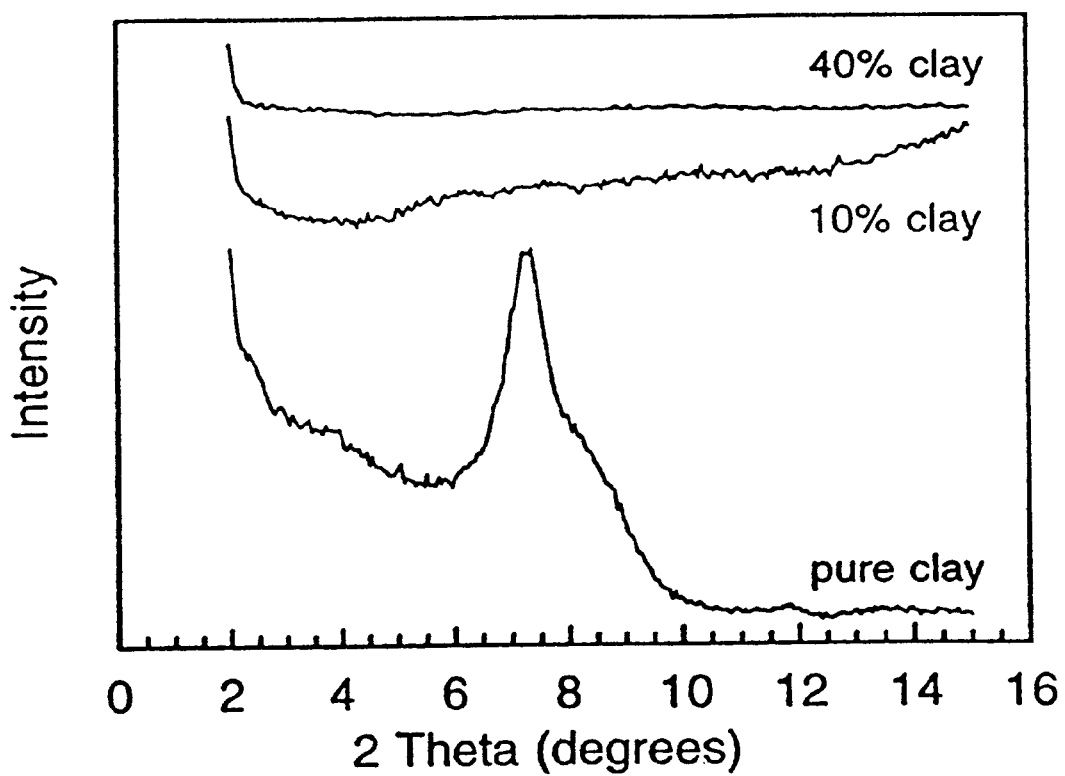
FIG. 2 is a composite of X-ray diffraction patterns of exfoliated nanocomposites prepared in solution.
Figure 3:
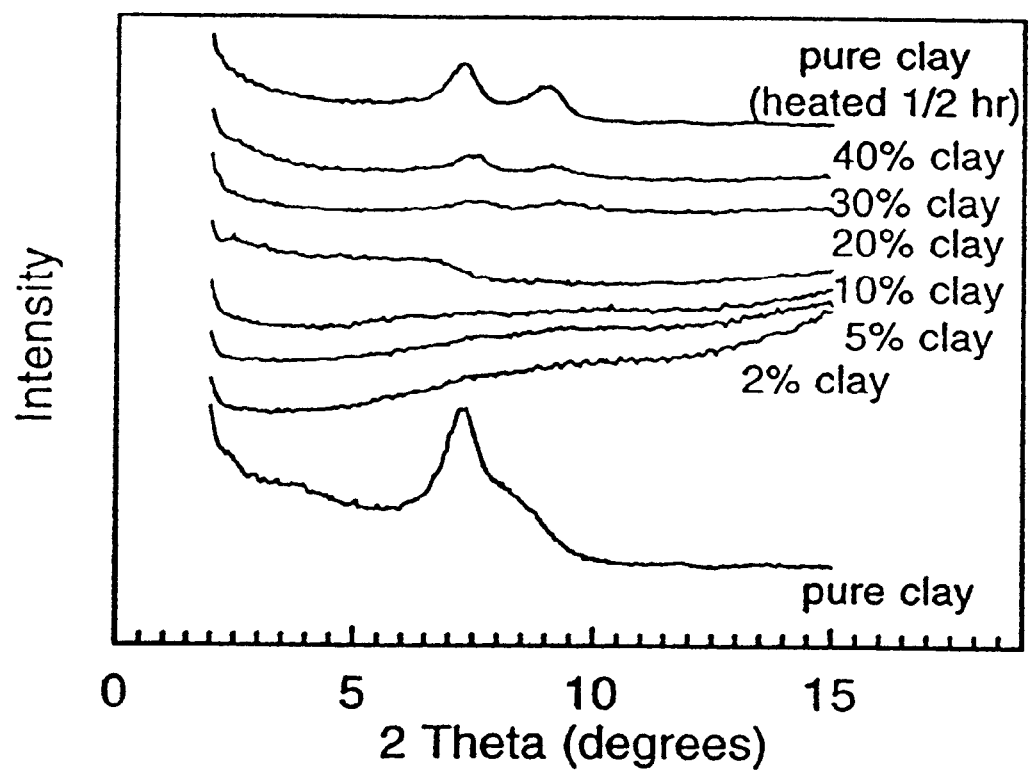
FIG. 3 is a composite of X-ray diffraction patterns of exfoliated nanocomposites prepared in melt.

The XRD patterns in FIGS. 1, 2, and 3 show the shift in or absence of clay peaks in polybenzoxazine nanocomposites prepared by solution to yield an intercalated structure, solution to yield an exfoliated structure, and melt which resulted in exfoliation, respectively. The XRD pattern of the pure clay is included in each figure for comparison. The three diffraction patterns shown in FIG. 1 show the increase in clay d-spacing corresponding to intercalated nanocomposites. The clay peak intensity of the sample with 20 wt. % clay is very large because this sample is the intercalated monomer. The XRD patterns of the samples with 10 wt. % and 30 wt. % clay illustrate that after curing there is a broadening of the clay peak, indicating a disruption of the silicate layers. However, FIG. 1 demonstrates that room temperature solution mixing yields intercalated structures before and after curing. Examination of the clay peak before cure results in an increase in the clay d-spacing between 0.068 and 0.278 nm, suggesting that the monomer is lying flat within the silicate layers.

Addition of heat during solution mixing results in an exfoliated structure as illustrated in FIG. 2 by an absence of the clay peak in the XRD patterns of FIG. 2. The additional heat increases the thermal energy of the system, thus increasing the molecular motion of the $CHCl_3$ and $H_2O$. This additional molecular movement aids in the exfoliation of the clay. Melt mixing also results in an exfoliated structure as illustrated in FIG. 3.

Figure 4:
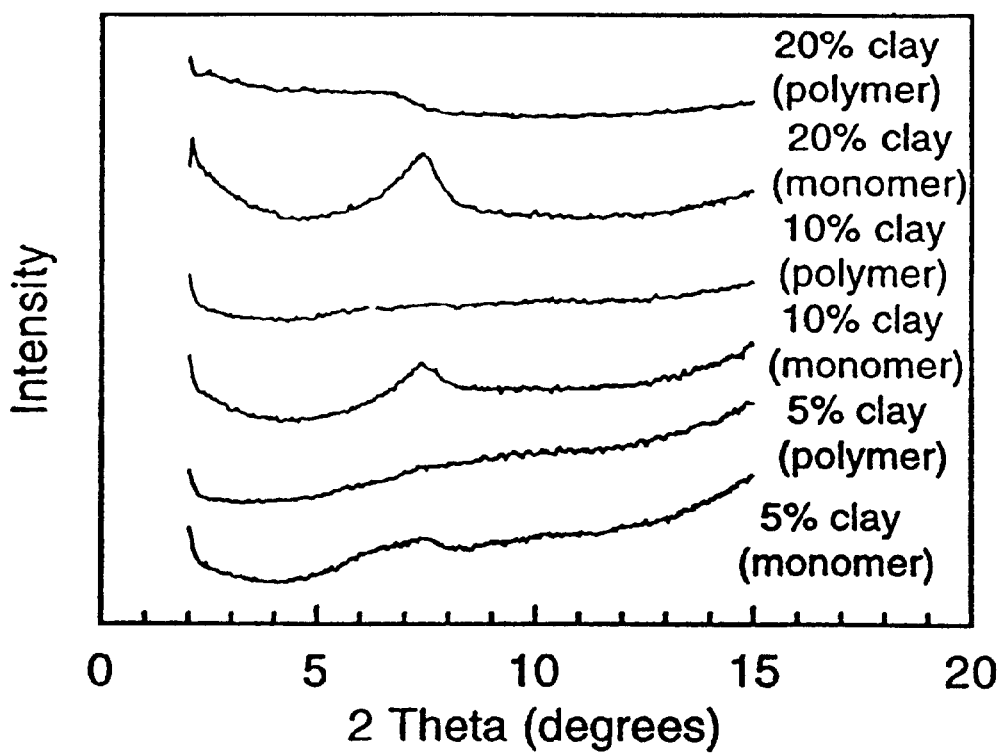
FIG. 4 is a composite of X-ray diffraction patterns showing nanocomposites formation upon curing.

However, as is shown in FIG. 4, melt mixing of the monomer and clay results in a simple physical mixture of the two materials. Therefore, the process of nanocomposite formation is very different in the room temperature solution and the melt mixing procedures, in the room temperature solution procedure mixed nanocomposites remain intercalated on curing and in the melt mixed procedure mixed nanocomposites become exfoliated on curing.

In solution mixing, the monomer is dissolved in $CHCl_3$, while the organophilic clay is dispersed in $H_2O$. The two phases are stirred rapidly so they mix, but are not miscible. However on mixing, the monomer can enter the clay at the interface of the two phases. The nanocomposite is formed with the monomer and the material remains intercalated on curing, maintaining the same d-spacing. During solution preparation, the water or solvent molecules in the system are capable of swelling the silicate galleries, increasing the interlayer spacing thus weakening the van der Waals interactions between the individual clay layers.

This facilitates the diffusion of the monomer into the clay, aiding in the intercalation of the monomer.

The melt mixed samples are prepared in the absence of solvent and there is no evidence of intercalation of monomer until curing. On thermal curing of the benzoxazine monomer, the ring opens resulting in a structure containing free hydroxyl groups on the bisphenol-A, and a Mannich bridge between the benzene rings, as shown below:

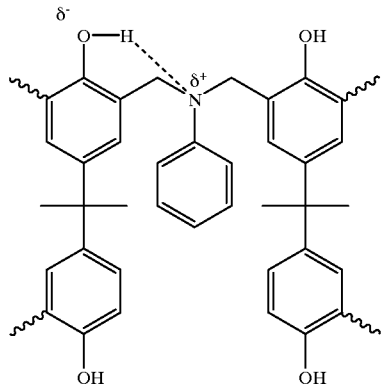

There is strong intramolecular bonding between the phenolic hydroxyl group and the nitrogen of the Mannich base. This hydrogen bonding creates a partially positive nitrogen which is capable of ionic interaction with the clay surface.

Figure 5:
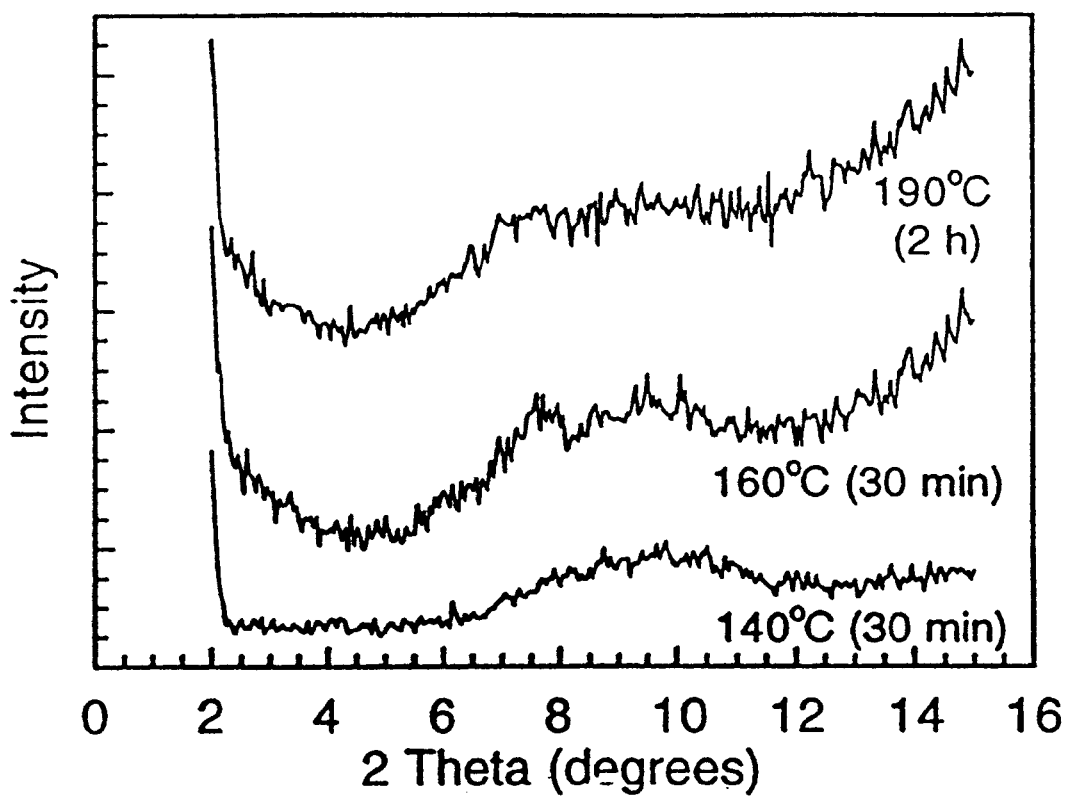
FIG. 5 is a composite of X-ray diffraction patterns of solution prepared nanocomposites formation as a function of cure time.

FIG. 5 shows the nanocomposite formation as a function of cure time. On melt mixing the monomer and clay at about 90° C. for 30 min (FIG. 4), the XRD shows a large clay peak, 2θ=7.4°, d=1.2 nm, indicating the monomer did not enter the clay. After curing for one half hour at about 140° C., the yellow monomer/clay mixture turns from yellow to green indicating the presence of an charge transfer complex. The clay peak in the XRD of FIG. 5 broadens as well as decreases in intensity, indicating disruption of the silicate layers. On further curing at about 160° C. for one half hour, the material began to turn orange/red, characteristic of this polybenzoxazine. The XRD pattern shows further exfoliation as more rings are opening creating more amino-cations. A peak at 2θ=9.5° is also evident. Finally, after curing at about 190° C. for 2 hours, the XRD pattern shows nearly complete exfoliation. Therefore, as the rings are opening, the benzoxazine can enter the clay. The peak at 2θ=9.5° is also observed if the clay alone is heated at about 90° C. for one half hour, and may correspond to a rearrangement of the amine.

Model compounds were used to investigate the nanocomposite formation due to the intramolecular hydrogen bonding from ring opening. The dimer compounds used both contain a Mannich bridge but only one has hydroxyl groups which can hydrogen bond with the nitrogen. The structures of these two dimers are shown below:

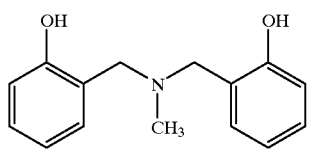

Phenolic Dimer

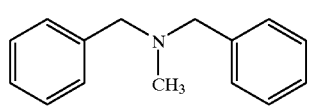

Benzyl Dimer

Figure 6A:
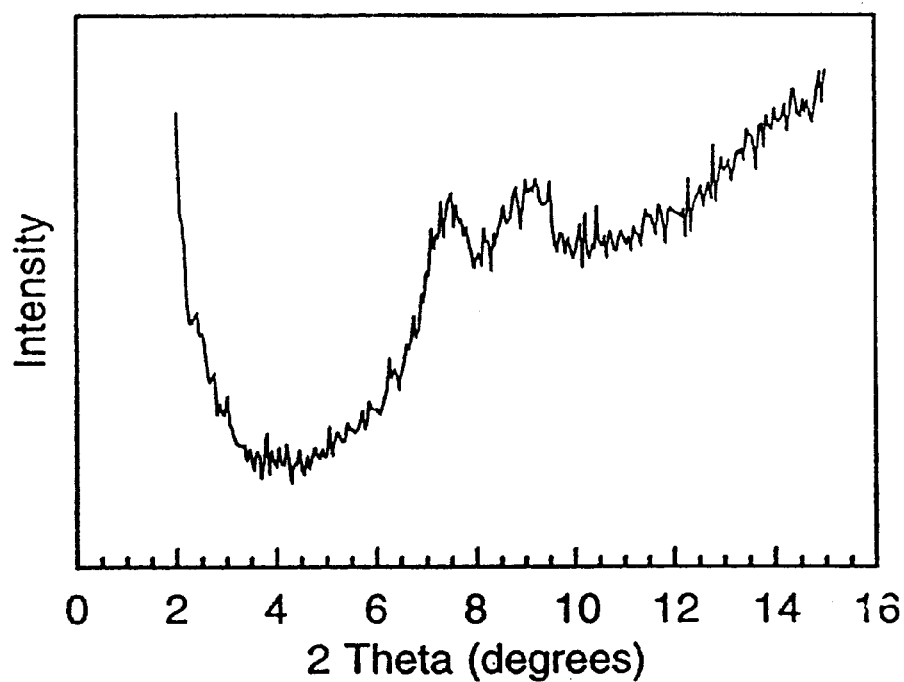
FIGS. 6A and 6B are X-ray diffraction patterns of two dimers, phenolic dimer and benzyl dimer, respectively, melt mixed with about 10 wt. % clay.
Figure 6B:
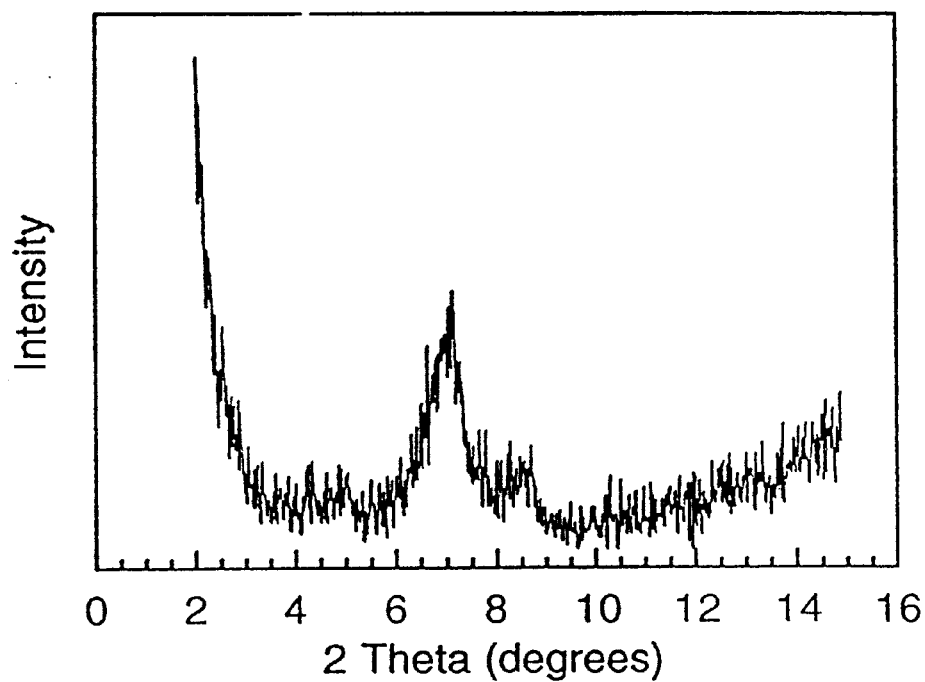

FIGS. 6A and 6B show the XRD patterns of the two dimers melt mixed with about 10 wt. % clay. With the phenolic dimer, where hydrogen bonding is present, two small clay peaks are observed; one at 2θ=7.4°, d=1.2 nm, and a second peak at a larger angle, 2θ=9.5°, d=0.93 nm, as was seen after curing the BA-a monomer at about 160° C. for 30 mm. XRD of the benzyl dimer does show a small shift in the clay peak to 2θ=7.0, ° d=1.3 nm. This swelling of the clay by this material is facilitated by the fact that it is a low molecular weight liquid at room temperature, yet there is not an appreciable change in the clay structure. The benzyl dimer also shows a small peak at 2θ=8.5°, which may be due to a redistribution of the amine. However, the intensity of the peak at 2θ=7.0° is significantly larger, suggesting the majority of the clay is only slightly swollen. This data suggests that the open ring structure is critical to nanocomposite formation in the melt.

Aside from the mechanism by which BA-a monomer disperses the clay, a second difference in solution and melt mixing is the amount of clay necessary to yield a nanostructure. The room temperature solution method requires a minimum of about 10wt. % clay to obtain an intercalated nanocomposite. This result is contradictory to what is expected, perhaps in melt mixing, where a large excess of intercalant in the mixture will facilitate development of a nanocomposite structure. However, in solution, nanocomposite formation is dependent upon the number of collisions between a benzoxazine monomer and a clay particle. This number will be dependant on the solvent concentration, and with a low clay concentration and a high solvent concentration the two materials may not meet. Therefore, the concentration of each layer was decreased by about 50%, i.e. 25 ml, each $H_2O$ and $CHCl_3$, and the monomer was mixed with about 5 wt. % clay. At these concentrations, an exfoliated nanocomposite was obtained. Upon increasing the solvent concentration to 35 ml, of each component, there is evidence of a small peak corresponding to intercalation, but the majority of the clay was exfoliated. Therefore, in solution at room temperature, only an exfoliated structure was obtained when about 5 wt. % of clay was used.

Complete exfoliation is obtained by the melt method with clay concentrations between about 2 and about 20 wt. %, the about 20 wt. % sample shows a broad residual clay peak. Samples containing about 30 and about 40 wt. % clay show a diffraction peak corresponding to the original d-spacing of the treated clay, 2θ=7.4°, d=1.2 nm, and a second peak at a larger angle, 2θ=9.5°, d=0.93 nm.

There is a large difference in the physical appearance of the intercalated and exfoliated structures, at lower clay concentrations. The intercalated samples are powders while the exfoliated samples resemble bulk poly(BA-a). At about 30 and about 40 wt. % clay, both intercalated and exfoliated nanocomposites are powder. The samples prepared in solution are also powders.

The blends of clay and benzoxazine monomer, oligomer, and/or polymer disclosed herein are useful as precursors to a char such as those used in aircraft brake pads and other ceramic type articles made by charring and shaping benzoxazine polymers. They are also useful as thermally stable polymers for a variety of molded articles such as the molded articles made from phenolic and/or epoxy resins. The blends are useful as packaging materials, coatings, adhesives, and composite materials for general or specific applications.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A nanocomposite composition comprising clay and a benzoxazine monomer, oligomer, and/or polymer in amount effective to form nanocomposite.

2. The composition of claim 1, wherein the presence of the benzoxazine monomer, oligomer, and/or polymer in the clay results in an at least about 5% increase in the spacing between the platelets of the clay.

3. The composition of claim 1, wherein the amount of clay is at least about 1 part by weight per about 100 parts by weight of benzoxazine monomer, oligomer, and/or polymer.

4. The composition of claim 1, wherein the clay is a silicate clay.

5. The composition of claim 4, wherein the silicate clay is montmorillonite, atapulgite, illite, bentonite, or halloysite.

6. The composition of claim 1, wherein the clay is chemically modified.

7. The composition of claim 1, wherein the clay is a modified clay which includes functionalized clay.

8. The composition of claim 1, wherein the clay has a particle size of less than about 200 microns.

9. The composition of claim 1, wherein the clay has a particle size of less than about 50 microns.

10. The composition of claim 1, wherein the benzoxazine monomer, or a oligomer or polymer derived therefrom, contains at least 10 mole % of one or more of benzoxazine monomers having the general formula

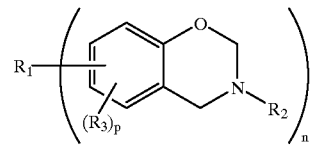

wherein $R_1$ individually is one or more groups selected from H; alkyl groups of 1 to 10 carbon atoms; aromatic groups, alkyl substituted aromatic groups, or aromatic substituted alkyl of 6 to 20 carbon atoms; mono or poly fluorine substituted compounds having at least one aromatic ring and 6 to 20 carbon atoms; or a benzoxazine from a phenolic compound of 6 to 20 carbon atoms; n is from 1 to 4; $R_2$ is an alkyl group of 1 to 10 carbon atoms; an aromatic group, a alkyl substituted aromatic groups or a aromatic substituted alkyl group of 6 to 20 carbon atoms; an amine of 1 to 10 carbon atoms; or a benzoxazine of 9 to 20 carbon atoms; $R_3$ is H or $R_2$; and p is an integer from 0 to 3.

11. The composition of claim 1, wherein the presence of the benzoxazine monomer, oligomer, and/or polymer in the clay results in at least about 5 wt. % of the clay being exfoliated.

12. The composition of claim 1, wherein the benzoxazine monomer, oligomer, and/or polymer is either bis(3,4-dihydro-2H-3-phenyl-1,3-benzoxazinyl)isopropane or is formed therefrom.

13. A nanocomposite composition comprising clay and a benzoxazine monomer, oligomer, and/or polymer is an amount effective to form nanocomposite wherein the benzoxazine monomer, oligomer, and/or polymer is either bis (3,4-dihydro-2H-3-phenyl-1,3-benzoxazinyl)isopropane or is formed therefrom and wherein the presence of the benzoxazine monomer, oligomer, and/or polymer in the clay results in an at least about 5% increase in the spacing between the platelets of the clay.

14. A method for preparing a nanocomposite clay composition comprising the steps of:

(A) providing a mixture comprising (1) a benzoxazine oligomer or polymer and clay or (2) at least one phenolic compound derived from a benzoxazine oligomer or polymer, at least one primary amine, at least one aldehyde and clay; and (B) curing the mixture to produce a nanocomposite composition.

15. The method of claim 14, wherein the nanocomposite is intercalated.

16. The method of claim 14, further comprising the step of heating the reaction mixture below a curing temperature before the curing step.

17. The method of claim 16, wherein the nanocomposite is exfoliated.

18. The method of claim 16, wherein the nanocomposite is intercalated with at least about 5% being exfoliated.

19. The method of claim 17, wherein the reaction mixture is prepared by combining and heating the phenolic compound, the primary amine, and the aldehyde and thereafter combining them with the clay in step (A).

20. The method of claim 18, wherein the nanocomposite is exfoliated.

21. The method of claim 14, wherein the benzoxazine compound which contains at least 25 mole % of one or more of benzoxazine monomers having the general formula

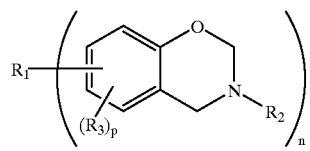

wherein $R_1$ individually is one or more groups selected from H; alkyl groups of 1 to 10 carbon atoms; aromatic groups, alkyl substituted aromatic groups, or aromatic substituted alkyl of 6 to 20 carbon atoms; mono or poly fluorine substituted compounds having at least one aromatic ring and 6 to 20 carbon atoms; or a benzoxazine from a phenolic compound of 6 to 20 carbon atoms; n is from 1 to 4; $R_2$ is an alkyl group of 1 to 10 carbon atoms; an aromatic group, a alkyl substituted aromatic groups or a aromatic substituted alkyl group of 6 to 20 carbon atoms; an amine of 1 to 10 carbon atoms; or a benzoxazine of 9 to 20 carbon atoms; $R_3$ is H or $R_2$; and p is an integer from 0 to 3.

22. The method of claim 14, wherein the phenolic compound has the general formula

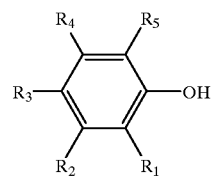

in which $R_1$ through $R_5$ can independently be H; OH; halogen; linear or branched aliphatic groups having from 1 to 10 carbon atoms; mono, di, or polyvalent aromatic groups having from 6 to 12 carbon atoms; or a combination of said aliphatic groups and said aromatic groups having from 7 to 12 carbon atoms; mono and divalent phosphine groups having up to 6 carbon atoms; or mono, di and polyvalent amines having up to 6 carbon atoms.

23. The method of claim 14, wherein the amine has the general formula

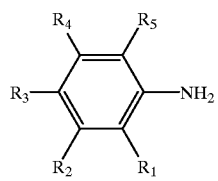

in which $R_1$ through $R_5$ can independently be H; OH; halogen; linear or branched aliphatic groups having from 1 to 10 carbon atoms; mono, di, or polyvalent aromatic groups having from 6 to 12 carbon atoms; or a combination of said aliphatic groups and said aromatic groups having from 7 to 12 carbon atoms; mono and divalent phosphine groups having up to 6 carbon atoms; or mono, di and polyvalent amines having up to 6 carbon atoms.

24. The method of claim 14, wherein the reaction mixture is free of solvent.

25. The method of claim 14, wherein the reaction mixture contains at least one solvent.

26. The method of claim 14, wherein step (B) further comprises the steps of:

(B-1) curing the reaction mixture at a temperature of about 140° C.;

(B-2) curing the reaction mixture at a temperature of about 160° C.; and (B-3) curing the reaction mixture at a temperature of about 190° C.

27. The method of claim 14, wherein the phenolic compound is bis(3,4-dihydro-2H-3-phenyl-1,3-benzoxazinyl) isopropane.

28. A method of forming a nanocomposite of clay with at least one benzoxazine compound comprising blending the clay with a benzoxazine monomer, oligomer, and/or polymer or benzoxazine precursors or combinations thereof with the benzoxazine component being in a liquid form such that the benzoxazine component can enter between the platelets of the clay under blending conditions.

29. The method of claim 28, wherein the benzoxazine benzoxazine monomer, oligomer, and/or polymer is either bis(3,4-dihydro-2H-3-phenyl-1,3-benzoxazinyl)isopropane or is formed therefrom.

* * * * *